US006430153B1

(12) United States Patent
Hughes et al.

(10) Patent No.: US 6,430,153 B1
(45) Date of Patent: Aug. 6, 2002

(54) TRUNK DELAY SIMULATOR

(75) Inventors: David A. Hughes, Mountain View; Madhav Marathe, Cupertino; Chang-Yu Wang, San Jose, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/148,410

(22) Filed: Sep. 4, 1998

(51) Int. Cl.[7] .............................................. H04L 12/54
(52) U.S. Cl. ................................ 370/230.1; 370/395.7; 370/412; 370/428
(58) Field of Search .................................. 370/252, 253, 370/395, 394, 235, 229, 230, 230.1, 231, 395.1, 395.7, 395.71, 395.72, 412, 413, 414, 415, 416, 417, 418, 419, 428, 429

(56) References Cited

U.S. PATENT DOCUMENTS

| | | | | |
|---|---|---|---|---|
| 5,014,265 A | * | 5/1991 | Hahne et al. | |
| 5,309,438 A | * | 5/1994 | Nakajima | 370/395 |
| 5,313,454 A | * | 5/1994 | Bustini et al. | |
| 5,499,238 A | * | 3/1996 | Shon | |
| 5,530,698 A | * | 6/1996 | Kozaki et al. | |
| 5,541,912 A | * | 7/1996 | Choudhury et al. | |
| 5,541,926 A | * | 7/1996 | Saito et al. | 370/395 |
| 5,550,823 A | * | 8/1996 | Irie et al. | 370/395 |
| 5,557,604 A | * | 9/1996 | Usumi et al. | 370/252 |
| 5,557,609 A | * | 9/1996 | Shobatake et al. | 370/412 |
| 5,742,606 A | | 4/1998 | Iliadis et al. | |
| 5,748,615 A | * | 5/1998 | Riedel et al. | 370/238 |
| 5,765,032 A | | 6/1998 | Valizadeh | |
| 5,774,466 A | * | 6/1998 | Hamamoto et al. | 370/416 |
| 5,796,735 A | | 8/1998 | Miller et al. | |
| 5,901,147 A | | 5/1999 | Joffe | |
| 5,914,934 A | * | 6/1999 | Rathnavelu | 370/229 |
| 5,914,954 A | * | 6/1999 | Nakayama | 370/394 |
| 5,953,336 A | * | 9/1999 | Moore et al. | 370/395 |
| 5,974,466 A | | 10/1999 | Mizutani et al. | |
| 5,991,274 A | * | 11/1999 | Grunenfelder et al. | 370/253 |
| 6,034,945 A | | 3/2000 | Hughes et al. | |
| 6,058,114 A | | 5/2000 | Sethuram et al. | |
| 6,201,813 B1 | | 3/2001 | Klausmeier et al. | |

FOREIGN PATENT DOCUMENTS

EP     0 706 298 A2     4/1996

OTHER PUBLICATIONS

Voshihiro Ohba, Vumiokamatani, et al.; Dynamic Threshold Control for Shared Buffer ATM SWI; Shingaku Giho [Technical Report of IEICE], SSE95–12 [May 1995]; PTO 98–3836; United States Patent and Trademark Office, Washington, D.C., Aug. 1998, Translated by the Ralph McElroy Translation Company.

Massoud R. Hashemi & Alberto Leon–Garcia from the dept. of electrical & computer engineering—University of Toronto; A General Purpose Cell Sequencer/Scheduler for ATM Switches; 0–8186–7780–5/97.

H. Jonathan Chao & Donald E. Smith; Design of Virtual Channel Queue in an ATM Broadband Terminal Adaptor; Article; Infocom '92; CH3133–6/92/0000–0294; Bellcore, 331 Newman Springs Rd., Red Bank, N.J. 07701–7040, U.S.A.

* cited by examiner

*Primary Examiner*—Ricky Ngo (57) ABSTRACT

A network cell is delayed by a predetermined time by injecting one or more delay cells ahead of the cell into a queue in a network (e.g., an ATM network). The queue may comprise a cell egress queue at a switch of the ATM network and the delay cells may be generated at the switch using a local processor. If required, additional cells may be generated by replicating the locally generated cells. The delay cells, including the replicated cells, may be stored together with the network cells in the queue; the number of delay cells so stored being controlled by configuring a threshold for the egress queue.

24 Claims, 8 Drawing Sheets

TRUNK DELAY SIMULATOR

FIELD OF THE INVENTION

The present invention relates to a method and apparatus for simulating delays experienced by information sent through a digital network, more specifically, trunk propagation delays within an ATM network.

BACKGROUND

Asynchronous Transfer Mode (ATM) or "cell switching" is a method of transmitting digital information wherein the information is broken into equal sized units called cells. The individual cells of information are transmitted from a source node to a destination node through a pathway (or connection) through a digital network. The digital network may be constructed of digital switches coupled together by digital communication links. These links may be trunks, which carry the cells of information between the digital switches along the connection. The digital switches route the cells from incoming communication links to outgoing communication links and finally to the destination node.

Real world networks may transport cells from a large number of switches across many links. Each of these links may have various propagation delays associated with them, some of which may be the result of significant use of the link or links. Designers of digital switches and networks must be cognizant of such factors when developing hardware and software for application in network environments. For example, those who design congestion control algorithms and the like must accurately account for real world propagation delays when developing the control schemes.

Unfortunately, trunk propagation delay simulators for ATM networks are not readily available. The few commercial propagation delay simulation systems which do exist are relatively expensive and most do not provide the capability of simulating links which operate at speeds of OC-3 or higher. In fact, the inventors are not aware of any commercially available simulators, which operate at speeds of OC-12. Thus, it would be desirable to have a delay simulator that can be used at these speeds and which does not require the use of expensive, custom systems.

SUMMARY OF THE INVENTION

It is an object of the invention to provide a trunk delay simulator capable of scalable operation.

In one embodiment, a method wherein a cell is delayed by a predetermined time by injecting one or more delay cells ahead of said cell into a queue in a network (e.g., an ATM network). The queue may comprise a cell egress queue at a switch of the ATM network and the delay cells may be generated at the switch using a local processor. If required, additional cells may be generated by replicating the locally generated cells. The delay cells, including the replicated cells, may be stored together with the network cells in the queue; the number of delay cells so stored being controlled by configuring a threshold for the egress queue.

In a further embodiment, trunk delay in a network (e.g., an ATM network) may be simulated by receiving, at a trunk delay simulator, a plurality of cells representing traffic in the network; and delaying each of the cells by a desired period of time. Preferably, delaying each of the cells is accomplished by injecting delay cells ahead of each of the network cells into a traffic flow at the simulator. Viewed another way, delaying each of the network cells is accomplished by servicing each of the cells from a queue, at intervals spaced to correspond to the desired period of time. These delay intervals may be created using delay cells stored in the queue along with the network cells. The number of delay cells stored in the queue may be dynamically controlled by configuring a threshold to limit the number of delay cells admitted to the queue.

In yet another embodiment, a trunk delay simulator which includes a queue configured to output network cells at times corresponding to a desired delay between their receipt and transmission is provided. The queue is also configured to service a number of delay cells prior to each of the network cells, the number of delay cells so serviced being controlled (e.g., using a configurable threshold associated with the queue) so as to allow the network cells to be serviced at the desired times. The trunk delay simulator preferably includes a local processor configured to inject the delay cells into the queue.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Methods and apparatus for using ATM queues to provide a trunk delay simulator are disclosed. Although discussed with reference to certain illustrated embodiments, upon review of this specification, those skilled in the art will recognize that the present invention may find application in a variety of systems. For example, although discussed with reference to ATM cells, the schemes described herein are equally applicable to networks which use variable length packets, and the term "cell" should be read as including such packets. Where such variable length packets are used, appropriate modifications may be required. For example, the thresholds discussed below may need to be specified in terms of bytes rather than cells. Therefore, in the following description the illustrated embodiments should be regarded as exemplary only and should not be deemed to limit the scope of the present invention.

Figure 1:
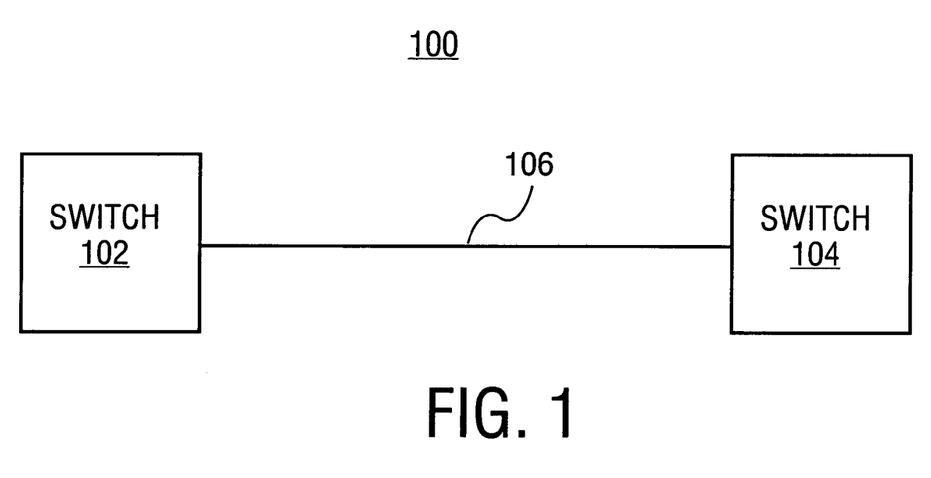
FIG. 1 illustrates a digital network for which delay on a trunk may be simulated in accordance with the present invention.

FIG. 1 illustrates a network simulator configured in accordance with one embodiment of the present invention. Simulator 100 includes two digital switches 102 and 104, coupled together via digital communication link 106. Simulator 100 is configured to represent a portion of a cell switched digital communication network constructed of digital switches that are capable of building virtual circuits for routing cells. For example, switches 102 and 104 may represent a portion of a backbone for a broadband digital Wide Area Network (WAN). Digital communication link 106 may represent any of a variety of broadband communication links, including E3 lines, T3 lines, OC-3 lines and OC-12 lines. In operation, simulator 100 is designed to simulate the propagation delay which may be experienced on a trunk coupling real world switches in a digital network. More particularly, existing components of switches 102 and 104 are modified to achieve the simulated propagation delay, thus eliminating the need for expensive, custom hardware solutions. To appreciate the modifications and the methodologies contemplated by the present invention; some information regarding the operation of switches 102 and 104 is provided.

Figure 2:
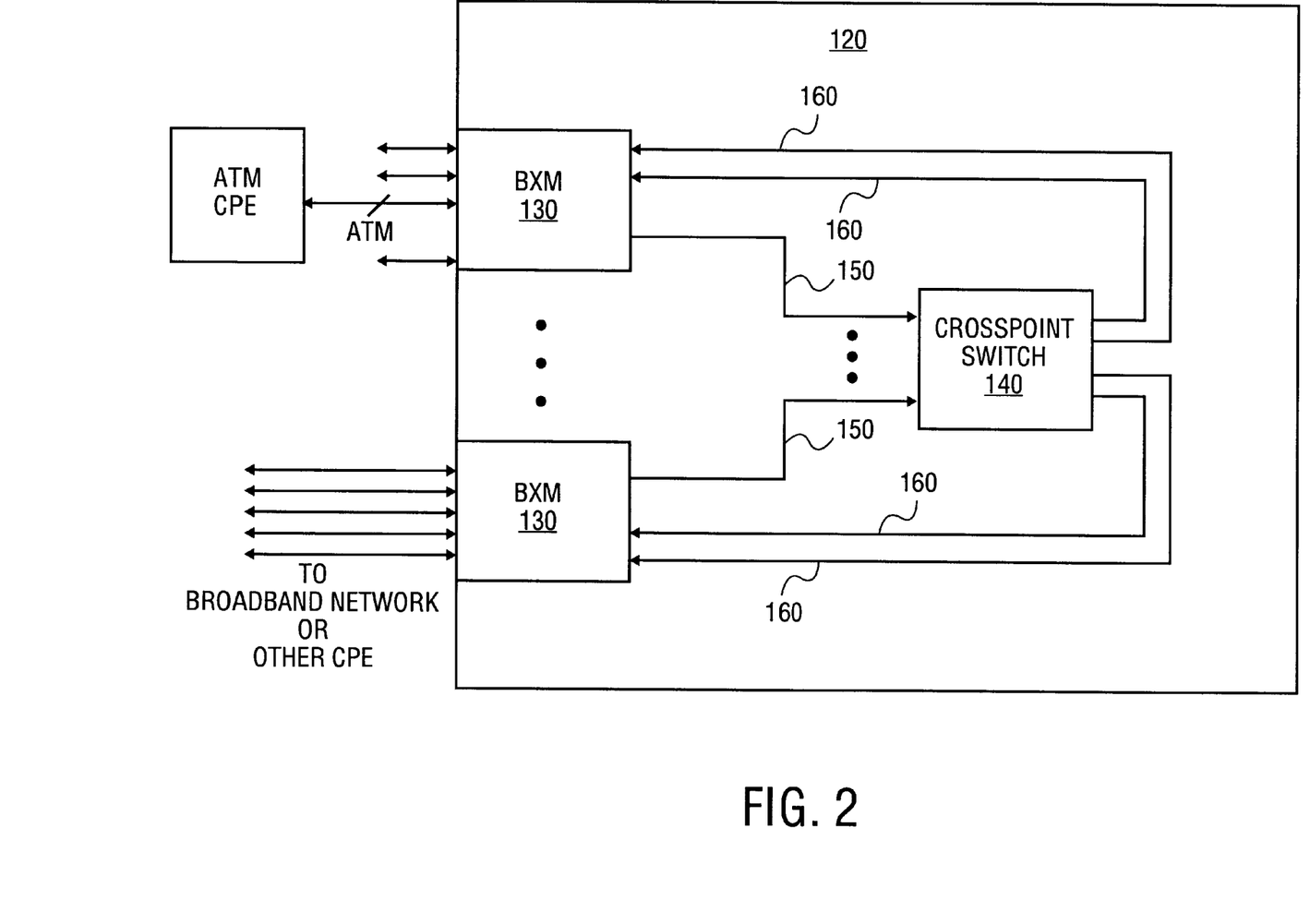
FIG. 2 illustrates functional components of a digital switch which may be configured as a trunk delay simulator in accordance with one embodiment of the present invention.

FIG. 2 illustrates a block diagram of the internal structure of a digital switch 120 (which may be substantially similar to switches 102 and 104). Each digital switch 120 includes a plurality of broadband switching modules (BXMs) 130 and a cross-point switch 140. BXMs 130 and cross-point switch 140 may each comprise one or more cards (e.g., front and back cards) which are housed within switch 120.

Each BXM 130 may include a network interface connected to a digital communication link. Every BXM 130 may also be coupled to a high-speed serial link 150 within the digital switch 120. In general, cells received from one of the digital communication links at one of the BXMs 130 are transferred from that BXM to cross-point switch 140 across a high-speed link 150. Cross-point switch 140 then routes those cells to another BXM 130 across a high-speed link 160. Ultimately, the cells are transmitted out of switch 120 on a digital communication link coupled to the second BXM. The asymmetric design of switch 120 allows two BXMs 130 to transmit cells through cross-point switch 140 to a single BXM 130 simultaneously.

Figure 3:
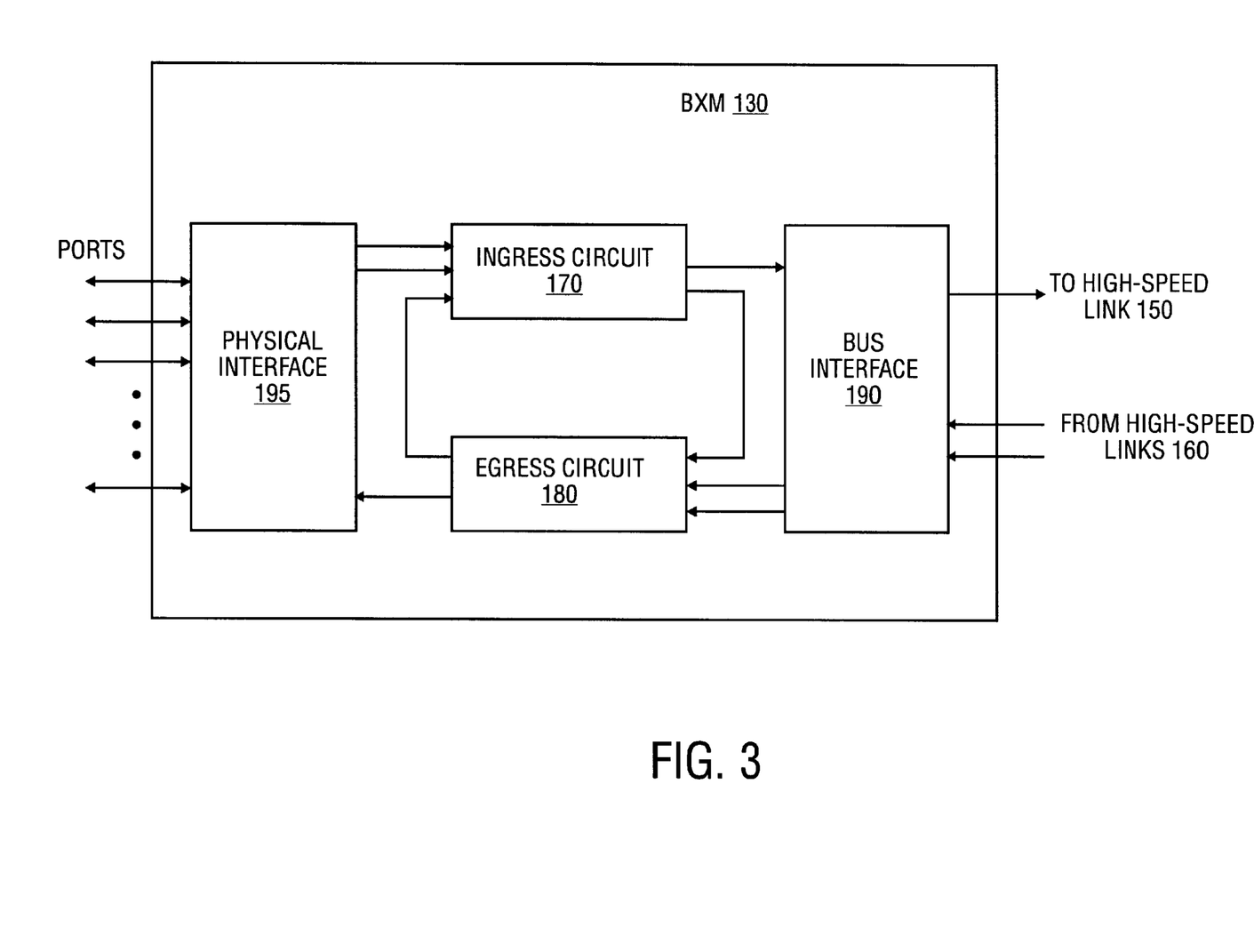
FIG. 3 illustrates functional components of a broadband switching module which may be configured as a trunk delay simulator in accordance with one embodiment of the present invention.

FIG. 3 illustrates an internal block diagram of a BXM 130. The BXM 130 includes an ingress circuit 170, an egress circuit 180, a bus interface circuit 190 and a physical interface circuit 195. The ingress circuit 170 processes incoming cells received from one of the digital communications links through physical interface circuit 195. The egress circuit 180 processes outgoing data cells received from bus interface circuit 190. Ingress circuit 170 and egress circuit 180 may be substantially similar in design. The bus interface circuit 190 is coupled to both the ingress circuit 170 and the egress circuit 180 and distributes data cells to and from the high-speed links 150 and 160 within the digital switch 120. The physical interface circuit 195 is also coupled to the ingress circuit 170 and the egress circuit 180 and distributes cells to and from the digital communication links coupled to the physical interface circuit 195 through one or more ports. In one embodiment, a BXM 130 is capable of receiving cells from high-speed links 160 at a rate of 2×OC-12. That is, bus interface circuit 190 is capable of receiving cells from each of two high-speed links 160 at a rate of OC-12. Cells may be transmitted to a high-speed link 150 or a port at a rate of 1×OC-12.

As will become apparent, as cells are received at switch 120, they are organized into logical queues depending on their associated connections or classes of service. The logical queues may be organized into groups, which (for egress circuit 180) may correspond to virtual interfaces (VIs). Later, the cells are transmitted out of switch 120, generally according to the demands of their associated classes of service. To properly manage the logical queues, a number of accounting records for each interface, connection and class of service are maintained at switch 120. For example, for each interface, records which track the total number of cells stored in memory for that interface are maintained. Such records (along with associated cell maximum thresholds for each interface) allow for control over the number of cells stored in memory per interface, thus preventing a single interface from monopolizing the memory resources of switch 120.

In addition to interface accounting records, records regarding the total number of cells stored for each class of service and each connection may be maintained. These records may be used in order to prevent a single class of service or connection from monopolizing the memory resources of switch 120 (and for limiting cell transfer delay in the case of classes of service). Threshold values including maximum cell counts, CLP (cell loss priority) thresholds, EPD (early packet discard) thresholds, and EFCI (explicit forward congestion indicator) thresholds are maintained for each class of service and connection. These thresholds may be used in the conventional fashion and allow circuitry within switch 120 to make decisions regarding whether or not to accept new cells for a given connection or class of service. In general, cell admission policies may be based on a comparison of the number of cells of a given connection or class of service (or the total number of cells) already stored in memory at switch 120 with a pre-established threshold. Any or all of these thresholds may be dynamically scaled as memory resources become filled in order to prevent congestion. A related U.S. patent application Ser. No. 08/648,556, entitled "Method and Apparatus for Per Traffic Flow Buffer Management", filed May 15, 1996, now U.S. Pat. No. 6,034,945 issued on Mar. 7, 2000, by David A. Hughes and Daniel E. Klausmeier, and a continuation thereof filed as application Ser. No. 09/490,548 filed Jan. 24, 2000, assigned to the Assignee of the present invention discuss such dynamic scaling techniques in detail.

Figure 4:
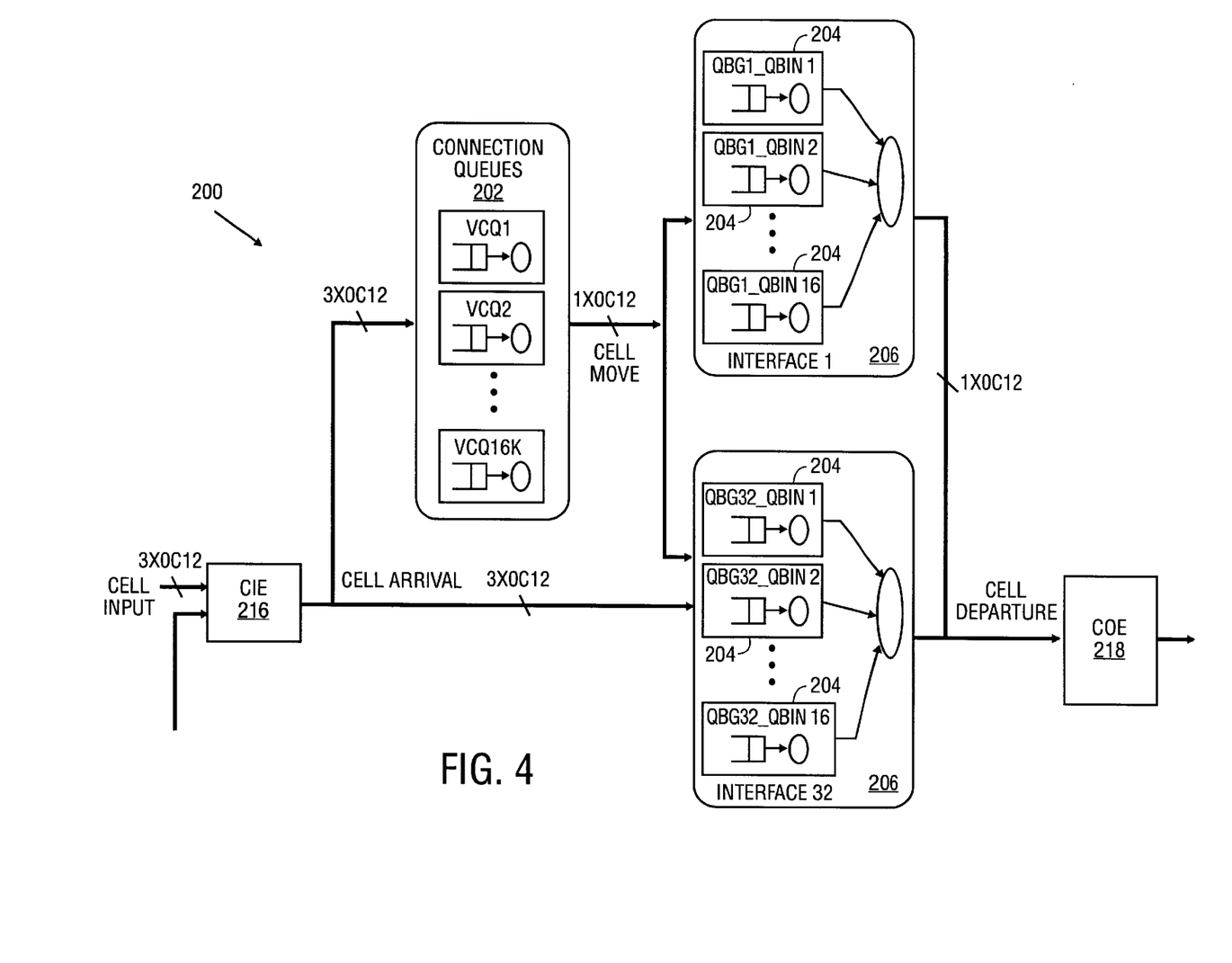
FIG. 4 illustrates functional components of an ATM queuing circuit for use as a trunk delay simulator according to one embodiment of the present invention.

FIG. 4 illustrates the functional components of an ATM queuing circuit 200, which may correspond to an ingress circuit or an egress circuit. Queuing circuit 200 maintains various cell queues, including individual connection (or VC) queues and class of service (or QBin) queues which are organized into groups (QBGs) and are used to sort different traffic types. The QBGs may correspond to different physical or virtual interfaces as described in application Ser. No. 08/885,400, entitled "Multi-Stage Queuing Discipline", filed Jun. 30, 1997, by Daniel E. Klausmeier, Kevin Wong, Quang Nguyen, Cherng-Ren Sue and David A. Hughes, and assigned to the Assignee of the present invention. Although in one embodiment queuing circuit 200 is implemented at a digital switch in an ATM network, such a queuing structure may find application in other nodes of a digital network.

ATM cells arrive and are placed into a queue in a cell memory until the cell is serviced. In one embodiment incoming cells are stored in separate dynamic random access memory (DRAM) and the various queues are implemented through the use of linked lists. The manner in which such linked list queues may be implemented and controlled is discussed in detail in application Ser. No. 08/884999, entitled "Method and Apparatus for Maximizing Memory Throughput", filed Jun. 30, 1997, by Daniel E. Klausmeier and Kevin Wong, and assigned to the Assignee of the present invention. Briefly, as cells are received at queuing circuit 200, they are temporarily stored in a cell memory prior to transmission on an outgoing communication link. A linked list database is used to keep track of the location and sequence of the cells in the cell memory. That is, a series of "next entry" pointers are established such that each sequence of entries is linked together. Each connection and class of service has a corresponding linked list queue (VC queue or QBin queue, respectively) and a queue manager maintains the links in each of the queues so that the entries (i.e., pointers) in the linked lists are updated to reflect cell arrivals (to the tail of a VC queue or a QBin queue), cell moves (from the head of a VC queue to the tail of a QBin queue) and cell departures (from the head of a QBin queue).

As indicated above, some cells are enqueued in connection (VC) queues 202 prior to being moved to QBins 204 for servicing. A service controller determines when cells will be moved from a VC queue 202 to a QBin 204. Cells are then transmitted out of the QBins 204 according to the instructions of a queue controller which selects the next eligible QBin group (QBG) 206 and QBin 204 for service based on service eligibility and service priorities.

In addition to traffic received from the digital communication links, some of the cells received at queuing circuit 200 may be generated by a local processor (i.e., a processor included within switch 120). Frames of data from the local processor may be segmented into ATM cells before they are injected into queuing circuit 200. The manner in which such operations are performed using the two tier queue structure already provided for other ATM traffic is discussed in co-pending application Ser. No. 08/884,705, entitled "Method and Apparatus for Using ATM Queues for Segmentation and Reassembly of Data Frames", filed Jun. 30, 1997, now U.S. Pat. No. 6,201,813 B1, issued on Mar. 13, 2001, by Daniel E. Klausmeier, Kevin Wong and David A. Hughes, and a continuation thereof filed as application Ser. No. 09/774,335 on Jan. 30, 2001, assigned to the Assignee of the present invention.

Figure 5:
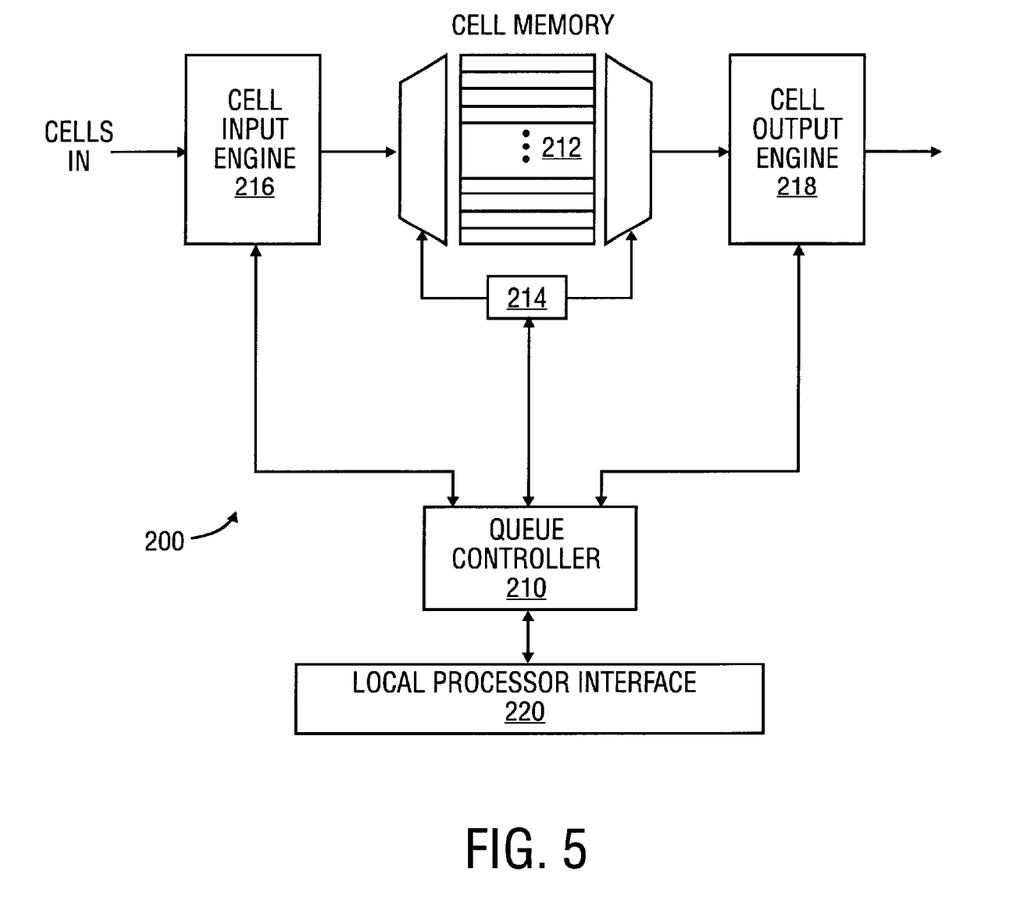
FIG. 5 is a block diagram illustrating the structure of the queuing circuit shown in FIG. 4 according to one embodiment of the present invention.

FIG. 5 illustrates a block diagram of the structure of queuing circuit 200 according to one embodiment of the present invention. Queuing circuit 200 is described in detail in related application Ser. No. 08/885400, filed Jun. 30, 1997, entitled "Multi-Stage Queuing Discipline". In summary, a queue controller 210 controls the storage of cells in cell memory 212 through cell memory controller 214 and keeps track of the location and sequence of the cells so stored through the use of linked lists. Cell input engine (CIE) 216 receives incoming cells and stores the received cells in a receive queue. After CIE 216 receives a cell, it extracts the cell's connection, source and other information, and presents the information to queue controller 210 for processing.

Upon receipt of the cell information provided by CIE 216, queue controller 210 checks the relevant cell count thresholds to determine whether the newly arriving cell can be accommodated in the cell memory 212. Assuming that the cell is accepted, queue controller 210 increments the appropriate statistics and cell counts for the arriving cell and determines where to store the cell in cell memory 212. This storage location is linked to the tail of the appropriate queue (VC queue 202 or QBin queue 204) and the cell is stored to cell memory 212 from CIE 216 under the control of cell memory controller 214.

The cell departure process involves the use of cell output engine (COE) 218. Cells depart from QBins 204 and queue controller 210 is responsible for selecting a QBin for service. Once a QBin has been selected for service, queue controller 210 finds the cell memory 212 location of the cell at the head of the selected QBin and provides this information to cell memory controller 214. The cell at the designated storage location is then read out of cell memory 212 to COE 218 that loads the cell into an output queue. Connection information from the departing cell is extracted and provided to queue controller 210 which uses this information to retrieve and update the relevant queue statistics and cell counts and provides COE 218 with VCI, VPI, and EFCI update information for the departing cell. COE 218 then transmits the cell.

As indicated above, queuing circuit 200 may be used by a local processor to accomplish frame injection. During frame injection, a data frame is segmented into ATM cells for handling by queuing circuit 200. This may be accomplished using a segmentation engine that may be part of local processor interface 220 and may further be performed under DMA control.

In general, the local processor may store data in an associated local memory (e.g., a RAM), for example as part of an application running on the local processor. When the data is to be transmitted, the local processor configures cell header information for the data and also determines the frame length in terms of the number of cells (48-byte payloads). The data frame may then be provided to a segmentation engine that will segment the frame into ATM cells for queuing circuit 200. Preferably, the frame of data is segmented into ATM cells according to the conventional AAL-5 protocol. The completed cells are then injected into CIE 216 through a dedicated cell input queue (not shown). Thus, the injected cells appear as regular ATM traffic to queuing circuit 200, allowing the use of the queuing structure described above.

In addition to handling the processing of regular ATM traffic, the BXMs 130 may be used to simulate trunk delay, in accordance with the methods of the present invention, by injecting and maintaining a constant number of "no-op" or delay cells in front of any incoming cell representing regular network traffic at an egress QBin. Thus, the incoming traffic is delayed by the injected traffic for a fixed amount of time.

Figure 6A:
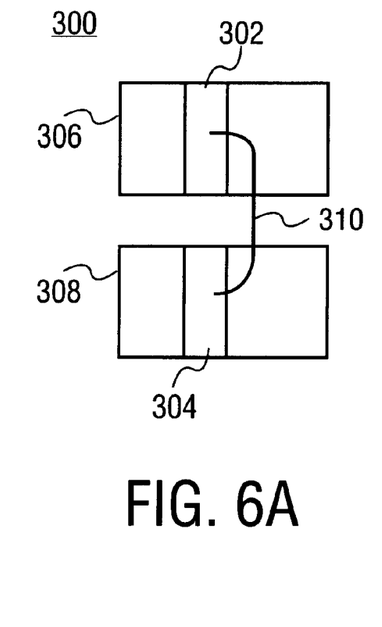
FIG. 6a illustrates a digital network having a communication link that may be simulated using the methods of the present invention.
Figure 6B:
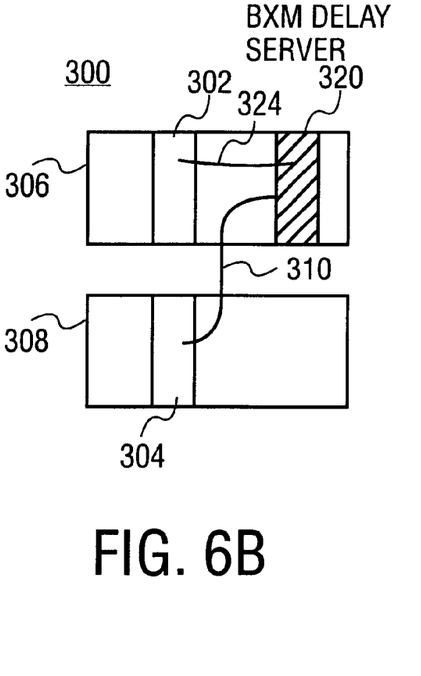
FIG. 6b illustrates one embodiment of a trunk delay simulator in accordance with the teachings of the present invention.
Figure 6C:
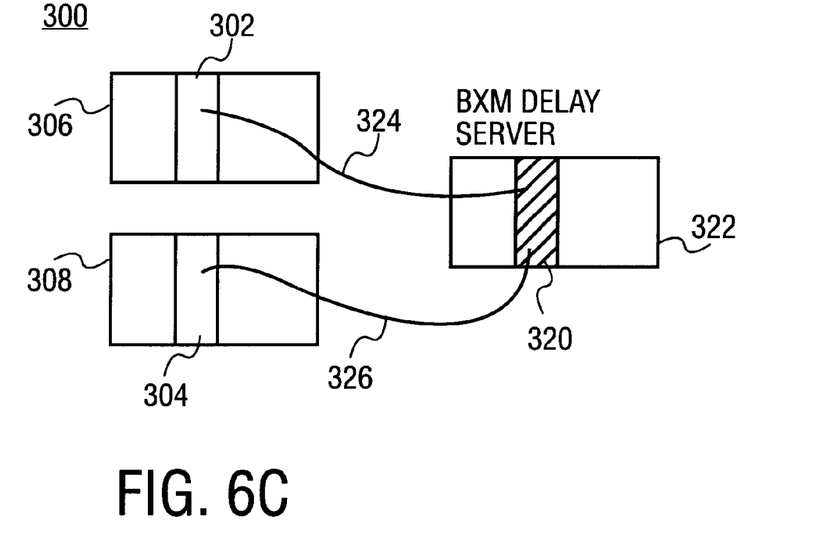
FIG. 6c illustrates an alternative embodiment of a trunk delay simulator in accordance with the teachings of the present invention.

FIGS. 6a, 6b and 6c illustrate alternative configurations for the use of a BXM 130 as a trunk delay simulator. In FIG. 6a, the simulated network 300 is represented using BXMs 302 and 304 in switches 306 and 308, respectively. The BXMs 302 and 304 are coupled so as to communicate with each other across digital link 310. Now, to simulate delay that may be experienced on link 310, a BXM delay server 320 maybe installed between the existing BXM cards 302 and 304. As shown in FIG. 6b, the BXM delay server 320 may be located on the same digital switch as one of the regular BXM cards (e.g., within switch 306). Alternatively, the BXM delay server 320 may be installed on a third node, for example switch 322. In either case, the BXM delay server 320 is coupled between BXMs 302 and 304 (e.g., using digital communication links 324 and 326) and should remain transparent to the network 300.

In operation, the BXM delay server 320 should allow regular network traffic (i.e., cells) received at one port (an input port) to be automatically directed to an output port. That is, the regular network traffic should be delayed, but no cells should be dropped. The BXM delay server 320 should also be capable of generating cells by itself. The generated cells are injected into the same QBin as the regular network traffic at the egress circuit of the BXM delay server 320 to simulate propagation delay on the link 310. Injected cells should arrive faster than the regular network traffic so as to keep the egress QBin non-empty.

For proper simulation, delay should be introduced in both directions. That is. cells transmitted by BXM 302 should be delayed en route to BXM 304 and vice-versa. Further, a control must be maintained on the percentage of injected cells in the egress QBins. The BXM delay server 320 has to be able to keep a constant number of injected cells in the QBin so that every incoming network traffic cell experiences the same length of delay. BXM delay server 320 also has to ensure that the injected cells do not occupy the entire egress QBin and cause cells from the regular network traffic to be dropped. Therefore, the goal is to keep the number of injected cells in the egress QBin at a fixed percentage of the maximum queue depth. This should be accomplished while allowing the length of the simulated delay to be user configurable, e.g., from 10 to 1000 msec.

Figure 7:
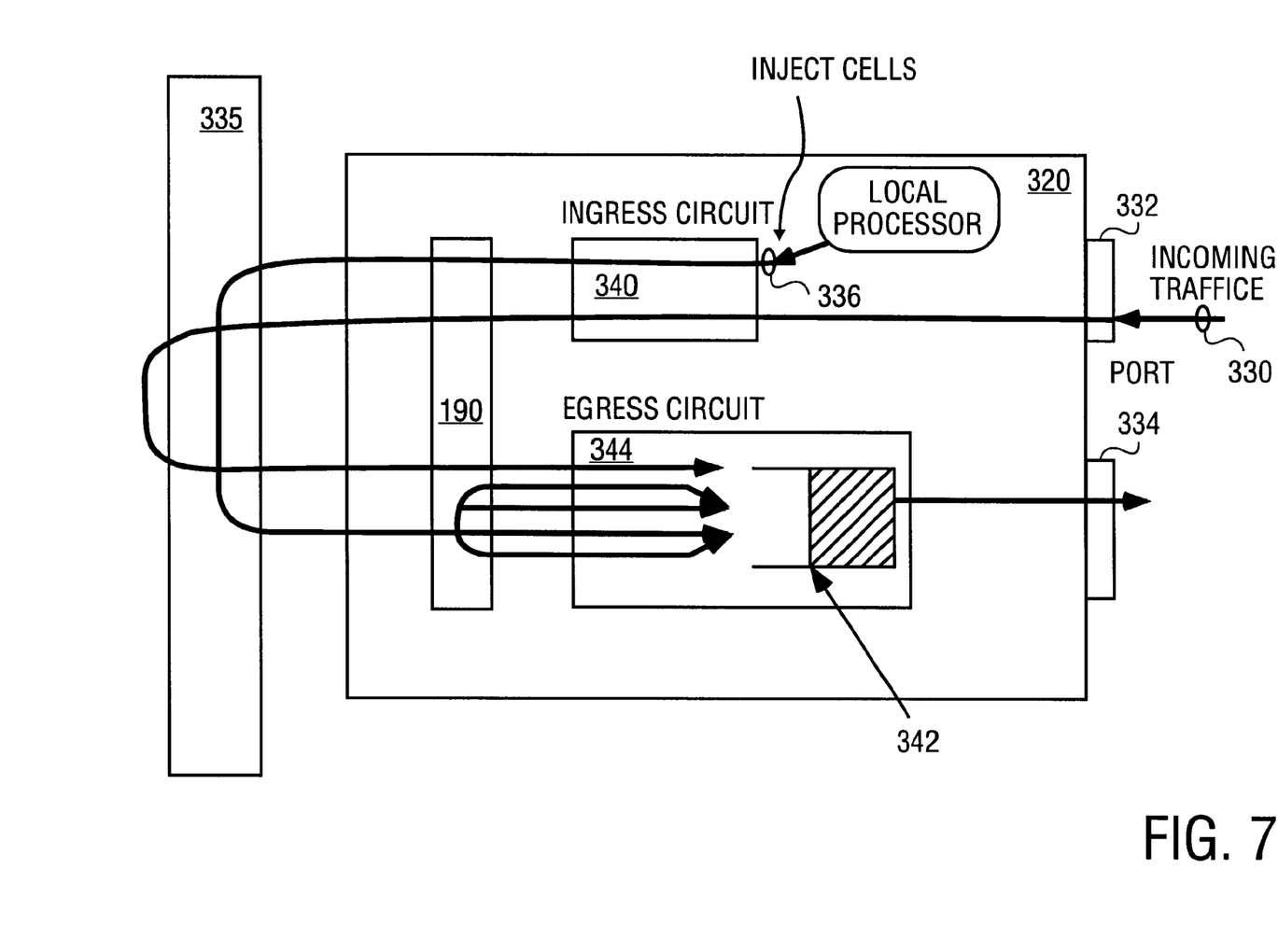
FIG. 7 illustrates the operation of a broadband switching module configured as a trunk delay simulator in accordance with one embodiment of the present invention.

As shown in FIG. 7, at BXM delay server 320 incoming network traffic 330 from input port 332 is directed to the output port 334 by preprogramming a sufficient number of virtual path connections to cover all possible values of VPIs that may exist. Thus, cells are routed from the input port 332 to the backplane 335 of the host switch (e.g., switch 306 or 322) and then to the output port 334 on BXM server 320. This comprises a traffic path configured to route the regular traffic ATM cells from the input port to the egress queue.

Because BXM delay server 320 already has the ability to inject AAL5 frames of data or raw cells into the QBins (as described above), this feature may be used to inject cells 336 into the ingress QBins of ingress circuit 340. If the cell injection rate is not high enough to keep the queue non-empty, some or all of the injected cells may be replicated (e.g., at bus interface 190) using the multicast capability of the BXM delay server 320 to achieve a higher cell arrival rate at the egress QBin 342 of egress circuit 344. The goal is to have the injected cells deposited in the same QBin (i.e., egress QBin 342) as the regular network traffic 330 in the egress circuit 344 of BXM delay server 320. By injecting cells into the egress QBin 342, regular network traffic cells 330 are serviced at an overall slower rate than would otherwise be the case. Thus, at the receiving BXM card (e.g., BXM 304), it appears these cells have been delayed en route (e.g., due to propagation delays on communication link 310). Injected and replicated cells may be discarded after departing the QBin 342; thus, the traffic used to simulate link delay may be totally hidden from the regular network data traffic.

Dynamic scaling may be used to control the QBin depth so that the injected cell traffic is not allowed to overwhelm the egress QBin 342 to the point where regular network traffic cells are dropped. Complete details regarding the dynamic scaling scheme may be found in co-pending application Ser. No. 08/648,556, now issued as U.S. Pat. No. 6,034,945. Briefly, when a global cell count or a connection's cell count reaches a predetermined percentage of its maximum value (e.g., 50% or more), each cell count generates its own scaling index based on the percentage of resources used. The scaling indexes are used to read out (e.g., from memory) associated scale factors from a scale factor table. The scale factor is used to scale back the connection's thresholds. In one embodiment, the scaling table may be user configurable.

Figure 8:
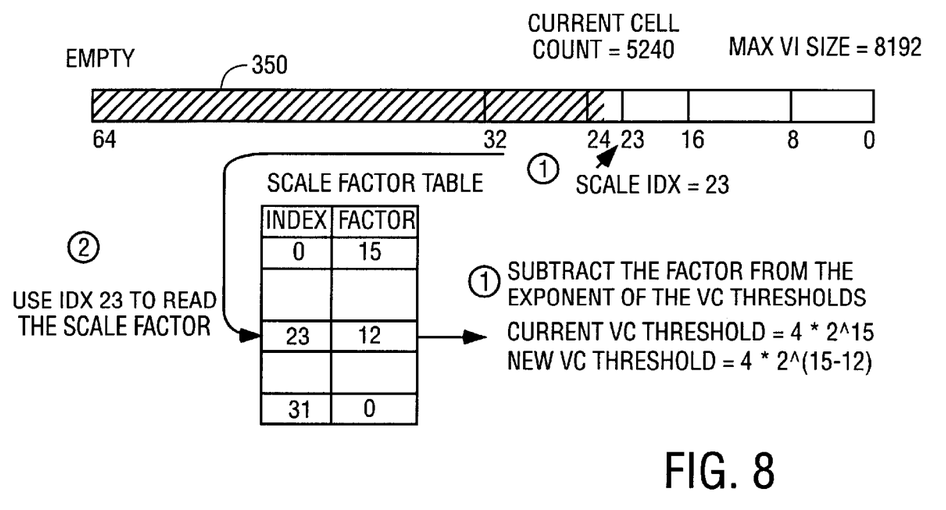
FIG. 8 illustrates the use of dynamic threshold scaling to control queue depth in a broadband switching module when used as a trunk delay simulator in accordance with one embodiment of the present invention.

As shown in FIG. 8, if the entire queue 350 is divided into 64 equal divisions, the scaling index then represents the number of divisions that are not used. For example, if the max size threshold for the connection is 8192 cells, each division's size is 8192/64=128. If the current cell count is then 5240 cells, the scaling index is (8192−5240)/128=23. The scaling index is then used to read the scale factor from the table 360 and the scale factor is used to set the new connection threshold.

Thus, the VC resources are scaled down by reducing the VC thresholds. In one embodiment, each VC has four thresholds, one of them being the max threshold which is the maximum number of cells that a VC can have in the queue (arriving cells are discarded if the threshold is reached). Dynamic VC scaling reduces the thresholds by subtracting the derived scale factor from the exponent of the VC thresholds (where, in this embodiment, the threshold records are stored in a format which allows for such scaling). For example, if the current VC max threshold is $4*2^{15}$, with scale factor equal to 12, the new VC threshold is $4*2^{(15-12)}$ $=4*2^3$.

By setting the VI max size, QBin max threshold, VC max threshold and the scaling class of each VC in the scale factor table, it is possible to control the number of cells for each VC in the queue. Consider the scale factor table in Table 1. Scaling class 0 has all the entries set to 0 which means that there is no scaling on connections with scaling class set to 0. Scaling class 1 has the first two entries set to 15 (which for this embodiment is the maximum value of the exponent of VC thresholds) which indicates that if the queue length reaches (64−2)/64=96.875% of the VI max size, the thresholds of all connections with scaling class 1 are scaled down to almost 0 (if original threshold=$4*2^{12}$, new threshold=4). The real traffic is configured to use scaling class 0 so its cells are not subject to the thresholds applied to the delay cells, which use scaling class 1, 2 or 3.

TABLE 1

| Scaling Class | 0 | 1 | 2 | ... | 16 | 17 | ... | 31 | Usage Percentage |
|---|---|---|---|---|---|---|---|---|---|
| 0 | 0 | 0 | 0 | ... | 0 | 0 | ... | 0 | No scaling |
| 1 | 15 | 15 | 0 | ... | 0 | 0 | ... | 0 | (64 − 2)/64 = 96.875% |
| 2 | 15 | 15 | 15 | ... | 15 | 0 | ... | 0 | (64 − 16)/64 = 75% |
| 3 | 15 | 15 | 15 | ... | 15 | 15 | ... | 15 | (64 − 32)/64 = 50% |

Therefore, the VI max size, QBin max threshold and the VC max threshold together determine the absolute value of the queue size and the number of entries which are set to 15 in the scale factor table determines the percentage of the queue that a connection cannot fill.

The above mechanism is applied to all the multicast connections to control the number of "no-op" cells in the egress QBin 342. Therefore, even though multicast cells are continually generated, they can only fill up the QBin to a fixed percentage of the maximum queue size and any remaining no-op cells are discarded. This is how fixed delay is achieved for the regular traffic. For one embodiment, the VI max size can be programmed to be 4k, 8k, 16k, 32k, 64k, 128k, 256k or 512k cells.

Figure 9:
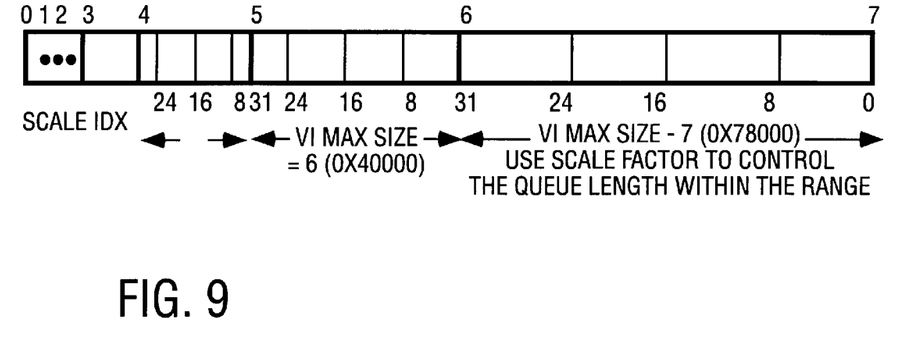
FIG. 9 illustrates the calibration of queue depth for a trunk delay simulator in accordance with one embodiment of the present invention.

FIG. 9 illustrates the calibration of the QBin depth using the mechanism just described. The VI max size decides the range of the actual QBin length and the range can be further subdivided into 32 sub-ranges by proper setting of the scale factor table. Note that the calibration is not uniform. The resolution is finer when the VI max size is smaller.

In operation, BXM delay server 320 is configured so that regular network traffic has scaling class 0 and multicast traffic has scaling class 1 to 3, depending on the required delay. The scaling classes are assigned such that connections belonging to different port-pairs have different scaling classes. Therefore, a user may introduce different lengths of delay on different port-pairs. However, both ports from the same port-pair have the same scaling class. Sufficient virtual path connections (4096 in on embodiment) to cover all possible VPIs of the incoming traffic are programmed so as to direct the traffic from the input port to the output port of the BXM delay server. One root multicast connection, which is used by the injected cells at the ingress direction, is also programmed. At the egress direction, the multicast leaf connections are programmed for each port. Note that the number of ports the BXM delay server can support is limited by the number of connections and multicast connections that a BXM card can support. This, in turn, depends on the available memory and the number of statistics to be maintained per connection.

Users may also configure the VI max size to get different ranges of delay. The QBin max threshold and VC thresholds of multicast connections on the same port are also changed to match the value of VI max size. Note that ports from the same port-pair may have different VI max sizes (but the same scaling class), this allows for different delays in different directions.

As indicated above, the maximum delay that any one BXM delay server can support is limited by the maximum queue length that the card can support. That is, $$delay = queue\_length/cell\_rate;$$

and $$queue\_length = VI\_max\_size * (64 - scale\_index)/64.$$

If a longer delay is desired, multiple BXM delay servers can be connected in series.

Thus a trunk delay simulator has been described. Although the foregoing description and accompanying figures discuss and illustrate specific exemplary embodiments, it should be appreciated that the present invention is to be measured only in terms of the claims that follow.

What is claimed is:

1. A method, comprising:
   delaying a cell by a predetermined time by injecting one or more delay cells ahead of said cell into an egress queue in a network; and
   dynamically adjusting a threshold for said egress queue to limit the number of said delay cells injected into said egress queue ahead of said cell.

2. The method of claim 1, wherein said egress queue comprises a cell egress queue at a switch of an ATM network.

3. The method of claim 2 wherein injecting one or more delay cells comprises generating said one or more delay cells at said switch using a local processor of said switch.

4. The method of claim 2 wherein injecting one or more delay cells comprises replicating locally generated cells at said switch to produce replicated cells which comprise at least some of said delay cells.

5. The method of claim 4 further comprising storing said replicated cells in said queue.

6. A method of simulating trunk delay in a network, comprising:
   receiving at a trunk delay simulator a plurality of cells representing traffic in a network;
   delaying each of said cells by a desired period of time at said trunk delay simulator to simulate propagation delays in said network; and
   dynamically controlling a number of delay cells stored in a queue by configuring a threshold to limit said number of said delay cells admitted to said queue.

7. The method of claim 6 wherein delaying each of said cells comprises injecting delay cells into a traffic flow ahead of each of said cells.

8. The method of claim 6 wherein delaying each of said cells comprises servicing each of said cells from a queue at intervals spaced to correspond to said desired period of time.

9. The method of claim 8 wherein said intervals are created using delay cells stored in said queue along with said cells.

10. The method of claim 9 wherein said delay cells are created at said trunk delay simulator.

11. The method of claim 10 wherein the number of said delay cells stored in said queue is configured so as to provide said desired period of time.

12. The method of claim 9 wherein said delay cells are discarded when they are removed from the queue.

13. A trunk delay simulator comprising:
   a queue configured to output network cells at times corresponding to a desired delay between receipt and transmission of the network cells; and
   a dynamically adjustable threshold for limiting a number of the output network cells, wherein said queue is further configured to service a number of delay cells prior to each of said network cells, the number of delay cells serviced being controlled to allow said network cells to be output at said times.

14. The trunk delay simulator of claim 13 further comprising a processor configured to inject said delay cells into said queue.

15. The trunk delay simulator of claim 14 wherein said queue is a cell egress queue.

16. The trunk delay simulator of claim 15 further comprising a traffic path configured to route said network cells from an input port to said queue.

17. The trunk delay simulator of claim 16 wherein said dynamically adjustable threshold associated with said queue represents the number of delay cells to be accommodated in said queue.

18. The trunk delay simulator of claim 13 further comprising a packet replicator configured to provide at least some of said delay cells from locally generated cells.

19. The trunk delay simulator of claim 13 wherein said network cells comprise variable length packets and configuring a threshold for said queue is accomplished in terms of bytes rather than in terms of cells.

20. A network device for delaying cells in a network environment, comprising:
   means for delaying a cell by a predetermined time by injecting one or more delay cells ahead of said cell into an egress queue in a network; and
   means for dynamically adjusting a threshold for said egress queue to limit the number of said delay cells injected into said egress queue ahead of said cell.

21. The network device of claim 20, wherein said egress queue comprises a cell egress queue at a switch of said ATM network.

22. The network device of claim 21 wherein injecting one or more delay cells comprises replicating locally generated cells at said switch to produce replicated cells which comprise at least some of said delay cells.

23. The network device of claim 22 further comprising means for storing said replicated cells in said queue.

24. An apparatus for simulating trunk delay in a network, comprising:

means for receiving at a trunk delay simulator a plurality of cells representing traffic in a network;

means for delaying each of said cells by a desired period of time at said trunk delay simulator to simulate propagation delays in said network; and means for dynamically controlling a number of delay cells stored in a queue by configuring a threshold to limit said number of said delay cells admitted to said queue.

\* \* \* \* \*